United States Patent
Hayano et al.

(10) Patent No.: US 9,563,146 B2
(45) Date of Patent: Feb. 7, 2017

(54) POLYETHER RUBBER, RUBBER COMPOSITION, CROSS-LINKED RUBBER, AND CONDUCTIVE MEMBER

(75) Inventors: Shigetaka Hayano, Tokyo (JP); Kentaro Tsubata, Tokyo (JP)

(73) Assignee: Zeon Corporation, Tokyo (JP)

( * ) Notice: Subject to any disclaimer, the term of this patent is extended or adjusted under 35 U.S.C. 154(b) by 583 days.

(21) Appl. No.: 13/882,103

(22) PCT Filed: Oct. 28, 2011

(86) PCT No.: PCT/JP2011/074893
§ 371 (c)(1),
(2), (4) Date: Apr. 26, 2013

(87) PCT Pub. No.: WO2012/057299
PCT Pub. Date: May 3, 2012

(65) Prior Publication Data
US 2013/0214209 A1    Aug. 22, 2013

(30) Foreign Application Priority Data

Oct. 29, 2010    (JP) .................................. 2010-243576

(51) Int. Cl.

| | | |
|---|---|---|
| *H01B 1/00* | (2006.01) | |
| *G03G 15/02* | (2006.01) | |
| *C08G 65/14* | (2006.01) | |
| *C08G 65/22* | (2006.01) | |
| *C08G 65/333* | (2006.01) | |
| *C08L 71/03* | (2006.01) | |

(52) U.S. Cl.
CPC ........... *G03G 15/0233* (2013.01); *C08G 65/14* (2013.01); *C08G 65/223* (2013.01); *C08G 65/33317* (2013.01); *C08L 71/03* (2013.01); *H01B 1/00* (2013.01)

(58) Field of Classification Search
CPC . C08G 65/14; C08G 65/223; C08G 65/33317; C08L 71/03; G03G 15/0233; H01B 1/00
See application file for complete search history.

(56) References Cited

U.S. PATENT DOCUMENTS

| | | | |
|---|---|---|---|
| 3,586,087 A | 6/1971 | Messerly | |
| 4,057,554 A | 11/1977 | Redmore et al. | |
| 6,400,919 B1 | 6/2002 | Inoue et al. | |
| 2004/0106708 A1 | 6/2004 | Mizumoto et al. | |
| 2006/0047054 A1 | 3/2006 | Wang et al. | |
| 2006/0074162 A1 | 4/2006 | Mizumoto et al. | |
| 2012/0296049 A1 | 11/2012 | Yonemaru et al. | |

FOREIGN PATENT DOCUMENTS

| | | |
|---|---|---|
| CN | 1500834 A | 6/2004 |
| GB | 1 208 474 A | 10/1970 |
| JP | 2001-166563 A | 6/2001 |
| JP | 2004-35868 A | 2/2004 |
| JP | 2004-217565 A | 8/2004 |
| JP | 2008-115402 A | 5/2008 |
| JP | 2008-303390 A | 12/2008 |
| JP | 2010-180357 A | 8/2010 |
| JP | 2010-211020 A | 9/2010 |
| WO | WO 2011/081152 A1 | 7/2011 |

OTHER PUBLICATIONS

International Search Report for PCT/JP2011/074893 mailed on Jan. 17, 2012.

*Primary Examiner* — Mark Kopec
*Assistant Examiner* — Jaison Thomas
(74) *Attorney, Agent, or Firm* — Birch, Stewart, Kolasch & Birch, LLP

(57) ABSTRACT

A polyether rubber comprising units expressed by the following general formula (1) in 0.1 mol % or more but less than 30 mol % is provided.

$$\left(\!\!\begin{array}{c}O\\|\\1\\|\\2\\|\\A^+\ X^-\end{array}\!\!\right) \tag{1}$$

(wherein in the above general formula (1), $A^+$ is a group which contains a cationic nitrogen-containing aromatic heterocyclic ring. Said group which contains a cationic nitrogen-containing aromatic heterocyclic ring is bonded with the carbon atom at the "2" position which is shown in the above general formula (1) through a nitrogen atom which forms said cationic nitrogen-containing aromatic heterocyclic ring. $X^-$ is arbitrary counter anion.)

13 Claims, No Drawings

POLYETHER RUBBER, RUBBER COMPOSITION, CROSS-LINKED RUBBER, AND CONDUCTIVE MEMBER

TECHNICAL FIELD

The present invention relates to a polyether rubber. In particular, it relates to a polyether rubber having a group which contains a cationic nitrogen-containing aromatic heterocyclic ring. Furthermore, the present invention relates to a rubber composition which contains the polyether rubber, a cross-linked rubber obtained by cross-linking it, and a conductive member which has that cross-linked rubber.

BACKGROUND ART

In a device of an image forming apparatus such as a printer, an electrophotographic copying machine, or a facsimile machine which is believed to require semi-conductivity, a conductive member such as a conductive roll, a conductive blade, or a conductive belt is used.

Depending on specific use, various properties including conductivity within a desired range (electrical resistance value and its variation, dependence on environment, and dependence on voltage), non-contaminating property, low hardness, and dimension stability are required for the conductive member.

As a way of providing conductivity to rubber for constituting part of a conductive member, a method of adding a small amount of a conductivity imparting material such as carbon black or metal oxide to rubber and dispersing it therein to control the electrical resistance of a conductive member is known. However, according to this method, it is difficult to control the dispersity of a small amount of the conductivity imparting material added by kneading and, since the dispersion state of the conductivity imparting material is changed according to flow of rubber during molding and cross-linking, causing a variation in electrical resistance value, and therefore there is a problem that a sharp image is difficult to be obtained.

Therefore, as a solution for the variation in electrical resistance value, polyether rubber or the like having semi-conductivity by itself without being added with a conductivity imparting material has been used as a conductive member. However, in recent days, high speed is required for an image forming apparatus, and the conductive member, in particular a conductive roll, requires to have even lower electrical resistance. As a method of lowering electrical resistance, increasing the unit amount of an ethylene oxide monomer as one of the constituent units of polyether rubber is effective. However, when the unit amount of an ethylene oxide monomer is increased, the rubber itself becomes water soluble, and therefore it may be difficult to produce it. Further, there is also a problem that it causes contamination of a photoconductor. Therefore, according to conventional methods, the unit amount of an ethylene oxide monomer in polyether rubber can be increased only to a certain level, and as a result, requirements for having low electrical resistance may not be fully satisfied.

Further, there has been conventionally a problem that, under application of voltage to a conductive member, upon continuous use, the conductive member deteriorated due to electric current so that electrical resistance value of the conductive member increases and quality of an image is impaired accordingly. For solving the problem, it is disclosed in Patent Document 1 that, by using a specific conductive material, the static friction coefficient on surface of a conductive member is kept at a specific value so that a variation in resistance in accordance with continuous use of a conductive member can be suppressed. However, it is not yet possible to satisfy the properties sought from conductive members in recent years, that is, the properties of reduction of the electrical resistance and suppression of change of resistance at the time of continuous use, without adding a conductivity imparting material (conductivity material).

PRIOR ART DOCUMENTS

Patent Documents

Patent Document 1: Japanese Patent Publication No. 2001-166563

SUMMARY OF THE INVENTION

Problem to be Solved by the Invention

An object of the present invention is to provide a conductive member which has little variation in electrical resistance value and has a low electrical resistance value, and even if used continuously, an increase in the electrical resistance value is suppressed, a cross-linked rubber which forms part of that conductive member, and a rubber composition containing a polyether rubber for constituting the cross-linked rubber. Furthermore, it is to provide a polyether rubber for constituting the rubber composition.

Means for Solving the Problems

The inventors engaged in intensive research to achieve the above object and as a result discovered that the object is achieved by a polyether rubber which contains a specific ratio of specific units having a group which contains cationic nitrogen-containing aromatic heterocyclic ring and thereby perfected the present invention.

Therefore, according to the present invention, there is provided a polyether rubber comprising units expressed by the following general formula (1) in 0.1 mol % or more but less than 30 mol %.

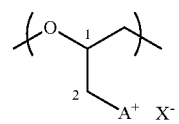

(1)

(wherein in the above general formula (1), A$^+$ is a group which contains a cationic nitrogen-containing aromatic heterocyclic ring. The group which contains a cationic nitrogen-containing aromatic heterocyclic ring is bonded with the carbon atom at the "2" position which is shown in the above general formula (1) through a nitrogen atom which forms the cationic nitrogen-containing aromatic heterocyclic ring. X$^-$ is arbitrary counter anion.)

The structure of the nitrogen-containing aromatic heterocyclic ring in the cationic nitrogen-containing aromatic heterocyclic ring is preferably a five-membered heterocyclic ring or six-membered heterocyclic ring. Further, the structure of the nitrogen-containing aromatic heterocyclic ring in the cationic nitrogen-containing aromatic heterocyclic ring is more preferably an imidazole ring.

Furthermore, a polyether rubber as set forth in any of the above which further contains cross-linkable monomer units is preferable. Further, as the cross-linkable monomer units, epihalohydrin monomer units and/or unsaturated oxide monomer units are preferable.

Further, according to the present invention, there is provided a rubber composition comprising the polyether rubber as set forth in any of the above and a cross-linking agent.

Further, according to the present invention, there is provided a rubber composition comprising a polyether rubber as set forth in any of the above and a filler.

Furthermore, a rubber composition comprising a polyether rubber as set forth in any of the above, a filler, and a cross-linking agent is preferable.

Further, according to the present invention, there is provided a cross-linked rubber obtained by cross-linking the rubber composition as set forth in any of the above.

Further, according to the present invention, there is provided a conductive member comprising the cross-linked rubber.

Effects of the Invention

According to the present invention, a conductive member which, even without adding a conductivity imparting material (conductivity material), has little variation in electrical resistance value, which has a low electrical resistance value, and which suppresses the increase in electrical resistance value even if used continuously, a cross-linked rubber with a small compression set for constituting part of the conductive member, and a rubber composition containing polyether rubber for constituting the cross-linked rubber are obtained. Furthermore, a polyether rubber for constituting the rubber composition is obtained.

DESCRIPTION OF EMBODIMENTS

Polyether Rubber

The polyether rubber of the present invention contains units expressed by the following general formula (1) in 0.1 mol % or more but less than 30 mol %.

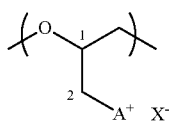

(1)

(wherein in the above general formula (1), $A^+$ is a group which contains a cationic nitrogen-containing aromatic heterocyclic ring. The group which contains a cationic nitrogen-containing aromatic heterocyclic ring is bonded with the carbon atom at the "2" position which is shown in the above general formula (1) through a nitrogen atom which forms the cationic nitrogen-containing aromatic heterocyclic ring. $X^-$ is arbitrary counter anion.)

The units shown in the above general formula (1) are usually obtained by substituting at least part of the halogen atoms forming epihalohydrin monomer units in a polyether rubber which contains epihalohydrin monomer units with a group which contain cationic nitrogen-containing aromatic heterocyclic ring.

The epihalohydrin monomer which forms the epihalohydrin monomer units is not particularly limited, but for example, epichlorohydrin, epibromohydrin, epiiodohydrin, epifluorohydrin, etc. may be mentioned. Among these as well, epichlorohydrin is preferable. The epihalohydrin monomer may be used as single type alone or may be used as two or more types together. The ratio of content of the epihalohydrin monomer units in the polyether rubber of the present invention is preferably, in the total monomer units, 99.9 to 0 mol %, more preferably 78.5 to 10 mol %, particularly preferably 57.3 to 15 mol %. If the ratio of content of the epihalohydrin monomer units is within this range, it is possible to obtain a polyether rubber which can give a cross-linked rubber with suppressed increase in volume resistivity value caused by electric current. On the other hand, if the ratio of content of the epihalohydrin monomer units is too large, sometimes the obtained cross-linked rubber will increase in volume resistivity value, while if the ratio is too small, sometimes the cross-linking becomes insufficient and the obtained cross-linked rubber becomes difficult to maintain in shape.

In the units expressed by the above general formula (1), $A^+$ is a group which contains a cationic nitrogen-containing aromatic heterocyclic ring. The group which contains this cationic nitrogen-containing aromatic heterocyclic ring is bonded with the carbon atom at the "2" position which is shown in the above general formula (1) through a nitrogen atom which forms the cationic nitrogen-containing aromatic heterocyclic ring. The nitrogen-containing aromatic heterocyclic ring in the cationic nitrogen-containing aromatic heterocyclic ring in the group which contains the cationic nitrogen-containing aromatic heterocyclic ring is not limited so long as it has a nitrogen atom in the ring and has an aromatic nature. For example, other than the nitrogen atom which bonds with the carbon atom at the "2" position which is shown in the above general formula (1) in the heterocyclic ring, this may have another nitrogen atom, may have hetero atom other than a nitrogen atom such as oxygen atom and sulfur atom, further, may have at least part of the atoms which form the heterocyclic ring substituted by substituents. Further, a polycyclic structure where two or more rings are condensed may also be used. As the structure of such a nitrogen-containing aromatic heterocyclic ring, for example, five-membered heterocyclic ring such as imidazole ring, pyrrole ring, thiazole ring, oxazole ring, pyrazole ring and isoxazole ring; six-membered heterocyclic ring such as pyridine ring, pyrazine ring, pyrimidine ring, pyridazine ring and triazine ring; condensed heterocyclic ring such as quinoline ring, isoquinoline ring, quinoxaline ring, quinazoline ring, cinnoline ring, purine ring, indole ring, isoindole ring, benzoimidazole ring, benzoxazole ring and benzoisoxazole ring; etc. may be mentioned. Among these as well, a five-membered heterocyclic ring and six-membered heterocyclic ring are preferable, while an imidazole ring is more preferable. In the polyether rubber of the present invention, in units expressed by the above general formula (1), $A^+$ is respectively independent. In the polyether rubber of the present invention, there may be two or more types of groups which contain cationic nitrogen-containing aromatic heterocyclic rings.

The substituent of the above nitrogen-containing aromatic heterocyclic ring is not particularly limited, but, for example, an alkyl group; cycloalkyl group; alkenyl group; aryl group; arylalkyl group; alkylaryl group; alkoxyl group; alkoxyalkyl group; aryloxy group; alkanol group; hydroxyl group; carbonyl group; alkoxycarbonyl group; amino group; imino group; nitrile group; alkylsilyl group; halogen atom; etc. may be mentioned.

In the present invention, in the above general formula (1), as the group which contains a cationic nitrogen-containing aromatic heterocyclic ring as shown by $A^+$, a group expressed by the following general formula (2) is preferable.

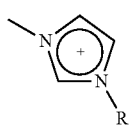

(2)

(wherein in the above general formula (1), the N— which is shown in the above general formula (2) is bonded with the carbon atom at the "2" position which is shown in the above general formula (1). Further, the R which is shown in the above general formula (2) indicates a hydrogen atom or a $C_1$ to $C_{20}$ hydrocarbon group.)

The R which is shown in the above general formula (2) is preferably a $C_1$ to $C_{10}$ alkyl group, more preferably a methyl group.

In the polyether rubber of the present invention, the ratio of content of the units expressed by the above general formula (1) is 0.1 mol % or more but less than 30 mol % in the total monomer units, preferably 0.5 mol % or more but less than 25 mol %, more preferably 0.7 mol % or more but less than 12 mol %. If the ratio of content of the units expressed by the above general formula (1) is within the above range, a polyether rubber is obtained which can give a cross-linked rubber which has a small compression set, which has a low electrical resistance value, and which can suppress the increase in volume resistivity value caused by electric current. On the other hand, if the ratio of content of the units expressed by the above general formula (1) is too small, sometimes the obtained cross-linked rubber becomes high in volume resistivity value and the electrical resistance value increases when continuous applying voltage. Further, if the ratio of content of the units expressed by the above general formula (1) is too large, sometimes the polyether rubber becomes hard and the properties of the rubber elastomer are lost.

The compound which is used for substituting at least part of the halogen atoms forming the epihalohydrin monomer units in the polyether rubber with groups which contain cationic nitrogen-containing aromatic heterocyclic rings (below, referred to as the "onium-forming agent") is not particularly limited so long as being a nitrogen atom-containing aromatic heterocyclic compound. For example, five-membered heterocyclic compound such as imidazole, 1-methylimidazole, pyrrole, 1-methylpyrrole, thiazole, oxazole, pyrazole and isoxazole; six-membered heterocyclic compound such as pyridine, pyrazine, pyrimidine, pyridazine, triazine and 2,6-lutidine; condensed heterocyclic compound such as quinoline, isoquinoline, quinoxaline, quinazoline, cinnoline, purine, indole, isoindole, benzoimidazole, benzoxazole and benzoisoxazole; etc. may be mentioned. Among these as well, five-membered heterocyclic compound and six-membered heterocyclic compound are preferable. From the viewpoint of the stability of the substance after the reaction, 1-methylimidazole is more preferable.

The method of substituting at least part of the halogen atoms which form the epihalohydrin monomer units in the polyether rubber with the groups which contain cationic nitrogen-containing aromatic heterocyclic ring (below, sometimes referred to as "onium ion-containing groups") is an application of a known onium-forming reaction, and the known onium-forming reaction is disclosed in Japanese Patent Publication No. 50-33271, Japanese Patent Publication No. 51-69434, and Japanese Patent Publication No. 52-42481, etc.

As the method of substituting at least part of the halogen atoms which form the epihalohydrin monomer units in the polyether rubber with onium ion-containing groups, it is possible to mix and react the onium-forming agent and polyether rubber which contains epihalohydrin monomer units for substitution. The method of mixing the onium-forming agent and polyether rubber is not particularly limited. For example, the method of adding and mixing the onium-forming agent to a solution which contains the polyether rubber, the method of adding and mixing the polyether rubber to a solution which contains the onium-forming agent, the method of preparing both the onium-forming agent and the polyether rubber as solutions and mixing the two solutions, etc. may be mentioned. In these cases, an onium-forming agent may be dissolved in a dispersion liquid in which a polyether rubber is dispersed, a polyether rubber may be added and dispersed in a solution which dissolves an onium-forming agent, an onium-forming agent may be dispersed in a solution which dissolves a polyether rubber, or a polyether rubber may be dissolved in a dispersion liquid in which an onium-forming agent is dispersed. The onium-forming agent or polyether rubber may be dissolved or dispersed in a solvent. Further, the onium-forming agent and the polyether rubber may be mixed with each other without intervention of a solvent, and they may be mixed with each other without intervention of a solvent followed by mixing with a solvent.

As a solvent, an inert solvent is suitably used. It may be nonpolar or polar. As a nonpolar solvent, for example, aromatic hydrocarbons such as benzene and toluene; saturated linear hydrocarbons such as n-pentane and n-hexane; alicyclic saturated hydrocarbons such as cyclopentane and cyclohexane; etc. may be mentioned. As the polar solvent, ethers such as tetrahydrofuran, anisole and diethyl ether; esters such as ethyl acetate and ethyl benzoate; ketones such as acetone, 2-butanone and acetophenone; aprotic polar solvents such as acetonitrile, dimethylformamide and dimethylsulfoxide; protic polar solvents such as ethanol, methanol and water; etc. may be mentioned. As the solvent, a mixed solvent of these may also be suitably used. Among these as well, from the viewpoint of the solubility of the polyether rubber and control of the reaction rate, a mixed solvent of a nonpolar solvent and polar solvent may be suitably used, but it is possible to determine the types and composition of the solvents used in accordance with the structure of the polyether rubber. Usually, when the polarity of the polyether rubber is low, it is preferable to use a mixed solvent with a higher ratio of nonpolar solvent in accordance with the degree of polarity. Further, a polar solvent with respect to a nonpolar solvent in an amount of 0.1 wt % or more, in particular 0.5 wt % or more and 30 wt % or less, is preferable from the viewpoint of improvement of the reaction rate. In particular, as the mixed solvent, from the viewpoint of the solubility of the polyether rubber, inclusion of toluene is preferable. A mixed solvent in which another polar solvent is mixed with the toluene is more preferable. As examples of the mixed solvent, toluene/acetonitrile, toluene/ethanol, toluene/methanol, toluene/water, etc. may be mentioned. The mixed solvent may be uniformly mixed or a nonpolar solvent and polar solvent may be dispersed without being compatible with each other. The mixed solvent may be used as a mixed solvent of a certain composition from the time of the reaction and may be changed in composition of solvent by addition of some solvent in the middle of the reaction. The amount of use of the solvent is not particularly limited, but the solvent is preferably used to give a concentration of the polyether rubber of 1 to 50 wt %, more preferably is used to give 3 to 40 wt %.

The amount of use of the onium-forming agent is not particularly limited, but may be determined in accordance with the structure of the onium-forming agent or polyether rubber used, the substitution rate of the onium ion-containing groups in the targeted polyether rubber, etc. Specifically, the amount of use of the onium-forming agent is usually 0.01 to 100 moles with respect to one mole of halogen atoms forming the used epihalohydrin monomer units, preferably 0.02 to 50 moles, more preferably 0.03 to 10 moles, furthermore preferably 0.05 to 2 moles in range. If the amount of the onium-forming agent is too small, the substitution reaction will be slow and the desired composition of polyether rubber which has onium ion-containing groups (below, also called "cationized polyether rubber") is liable to be unable to be obtained. On the other hand, if the amount of the onium-forming agent is too large, it is liable to become difficult to remove the unreacted onium-forming agent from the obtained cationized polyether rubber.

Further, when using an onium-forming agent comprised of cyclic secondary amines such as pyrrole (in the present application, "cyclic secondary amines" meaning a nitrogen atom-containing aromatic heterocyclic compound wherein one hydrogen atom is bonded with a nitrogen atom in the ring, same below), the amount of use of the onium-forming agent is usually 0.01 to 2 moles, preferably 0.02 to 1.5 moles, more preferably 0.03 to 1 mole in range with respect to one mole of halogen atoms forming the epihalohydrin monomer units used. If the amount of the cyclic secondary amines is too small, the substitution reaction will be slow and the desired composition of cationized polyether rubber is liable to not be able to be obtained, while if the amount of the cyclic secondary amines is too great, due to the effects of the unreacted cyclic secondary amines which are in excess with respect to the halogen atoms in amount, control of the substitution rate of the onium ion-containing groups in the cationized polyether rubber is liable to become difficult.

Next, in accordance with need, it is possible to substitute a desired group for the hydrogen atom bonded with the nitrogen atom in the ring which is bonded with the carbon atom at the "2" position shown in the above general formula (1). After the reaction between the polyether rubber and the cyclic secondary amines, next the base is mixed in, the proton bonded with the nitrogen atom is disassociated, and, furthermore, for example, a halogenated alkyl is mixed in and added so as to introduce the desired substituent as in the following general formula (3).

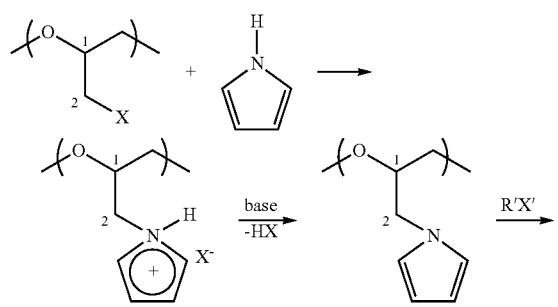

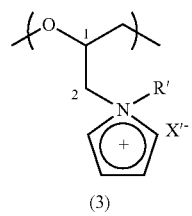

(3)

(wherein in the above general formula (3), R' is a $C_1$ to $C_{10}$ alkyl group, while X' is a halogen atom)

The pressure at the time of onium-forming reaction is usually 0.1 to 50 MPa, preferably 0.1 to 10 MPa, more preferably 0.1 to 5 MPa. Note that, "0.1 MPa" means causing a reaction at substantially atmospheric pressure. The temperature at the time of the reaction is usually 0 to 200° C., preferably 20 to 170° C., more preferably 40 to 150° C. If the reaction temperature is low, the progress of the reaction will be slow, while if the reaction temperature is high, a secondary reaction is liable to occur. The reaction time is usually 1 minute to 1000 hours, preferably 3 minutes to 800 hours, more preferably 5 minutes to 500 hours, furthermore preferably 30 minutes to 200 hours.

When not using a solvent at the time of a onium-forming reaction, the onium-forming agent and the polyether rubber may be uniformly mixed and heated for causing a reaction at a dry type kneader such as twin-screw kneader and, further, after this reaction or in the middle of the reaction, if necessary, the unreacted onium-forming agent or volatile products may be removed by degassing or washing. The kneading time when mixing the polyether rubber and onium-forming agent by a twin-screw kneader is not particularly limited. It is sufficient if the time required for substantially homogeneously mixing the polyether rubber and onium-forming agent and is usually 1 minute to 10 days, preferably 5 minutes to 1 day, more preferably 5 minutes to 5 hours. If the kneading time is too short, the onium-forming agent is liable to not be uniformly mixed. On the other hand, if too long, the stress which is applied at the time of kneading is liable to cause the polyether rubber to break down. Further, the mixing temperature is usually 0 to 200° C., preferably 20 to 180° C., more preferably 40 to 160° C. If the mixing temperature is too low, kneading of the polyether rubber tends to become difficult, so the mixing with the onium-forming agent is liable to become slower. On the other hand, if the mixing temperature is too high, the mixing of the polyether rubber and onium-forming agent will be fast, but the onium-forming reaction is liable to end up proceeding in an uneven state. Further, the polyether rubber is liable to break down and the onium-forming agent is liable to evaporate.

The arbitrary counter anion expressed by X⁻ of the above general formula (1) is a compound or atom which has a negative charge which is bonded with A⁺ by an ion bond and is not particularly limited other than that it have a negative charge. The counter anion is bonded via a dissociable ionic bond, and therefore at least part of these can be exchanged with any other counter anion according to a known ion exchange reaction. At the stage of mixing the onium-forming agent and polyether rubber which contains epihalohydrin monomer units and the end of the reaction, the X of the above general formula (1) is a halogen atom, but a known anion exchange reaction may be performed with respect to the counter anion of A⁺, that is, the halogen atom. The anion exchange reaction can be performed by mixing an ionic compound having a dissociating property with a polyether rubber which has onium ion-containing groups. The conditions for the anion exchange reaction are not particularly limited, but may be determined by the structure of the ionic compound or polyether rubber used, the targeted substitution rate of the counter anion of $A^+$, etc. The reaction may be performed by only the ionic compound and polyether rubber which has onium ion-containing groups or may be performed including an organic solvent or other compound. The amount of use of the ionic compound is not particularly limited, but is usually 0.01 to 100 moles with respect to one mole of halogen atoms forming the epihalohydrin monomer units used, preferably 0.02 to 50 moles, more preferably 0.03 to 10 moles in range. If the amount of the ionic compound is too small, progress of the substitution reaction is liable to become difficult. On the other hand, if too large, removal of the ionic compound is liable to become difficult.

The pressure at the time of an anion exchange reaction is usually 0.1 to 50 MPa, preferably 0.1 to 10 MPa, more preferably 0.1 to 5 MPa. The temperature at the time of the reaction is usually −30 to 200° C., preferably −15 to 180° C., more preferably 0 to 150° C. The reaction time is usually 1 minute to 1000 hours, preferably 3 minutes to 100 hours, more preferably 5 minutes to 10 hours, furthermore preferably 5 minutes to 3 hours.

The anion species of the counter anions is not particularly limited, but for example, halide ions such as fluoride ions, chloride ions, bromide ions and iodide ions; sulfuric acid ions; sulfurous acid ions; hydroxide ions; carbonate ions; hydrogencarbonate ions; nitrate ions; acetate ions; perchlorate ions; phosphate ions; alkyloxy ions; trifluoromethane sulfonate ions; bistrifluoromethane sulfonimide ions; hexafluorophosphate ions; and tetrafluoroborate ions; etc. may be mentioned.

To determine the content ratio of a unit represented by the formula (1) above in the polyether rubber of the present invention (herein below, referred to as "content ratio of onium ion unit"), a method well known in the art can be used. For simple and quantitative determination of the content ratio of onium ion unit, content of an onium ion-containing group can be quantified by $^1$H-NMR measurement of the polyether rubber of the present invention. Specifically, from the integrated values of the proton derived from the polyether chain that is a main chain of the cationized polyether rubber, mole number B1 of the entire monomer units in the polymer (including onium ion unit) is calculated. Subsequently, from the integrated values of the proton derived from an onium ion-containing group, mole number B2 of the onium ion unit introduced (the unit represented by the formula (1)) is calculated. Thereafter, by dividing the mole number B2 of the onium ion unit introduced (the unit represented by the formula (1)) by the mole number B1 of the entire monomer units in the polymer (including onium ion unit), content ratio of onium ion unit can be calculated based on the following formula (4).

Content ratio of onium ion unit (mol %)=100×B2/B1    (4)

Further, when the onium-forming agent used for the reaction is not consumed by any other reaction other than the substitution reaction of an onium ion-containing group under the reaction condition described above, molar amount of the consumed onium-forming agent will be the same as the molar amount of the halogen atoms substituted by the onium ion-containing group. Thus, by calculating the molar amount of consumed onium-forming agent by subtracting the residual molar amount of A2 after the reaction from the molar amount A1 added before the reaction and the resulting value is divided by molar amount P of the entire monomer units in base polyether rubber before the reaction with an onium-forming agent, content ratio of onium ion unit can be also calculated based on the following formula (5).

Content ratio of onium ion unit (mol %)=100×(A1−A2)/P    (5)

Molar consumption amount can be measured by a known measurement method. The reaction ratio can be measured by gas chromatography (GC) equipped with a capillary column and a flame ionization detector (FID).

When the polyether rubber of the present invention is cross-linked, the polyether rubber of the present invention preferably contains a cross-linkable monomer unit. As the preferred cross-linkable monomer unit, an epihalohydrin monomer unit and/or an unsaturated oxide monomer unit are preferable.

Further, when the polyether rubber of the present invention is used as a conductive member, in particular as a material of a conductive roll, polyether rubber of the present invention preferably contains an ethylene oxide monomer unit from the view point of having low electrical resistance.

The polyether rubber of the present invention contains the unit represented by the above general formula (1) as an essential component, and is preferably a copolymer containing the unit represented by the above general formula (1) and [epihalohydrin monomer unit and/or unsaturated oxide monomer unit], more preferably a copolymer containing the unit represented by the above general formula (1), an ethylene oxide monomer unit, and [epihalohydrin monomer unit and/or unsaturated oxide monomer unit], and furthermore preferably a copolymer containing the unit represented by the above general formula (1), an ethylene oxide monomer unit, an epihalohydrin monomer unit, and an unsaturated oxide monomer unit.

The unsaturated oxide monomer which forms the unsaturated oxide monomer unit is not particularly limited so long as containing in the molecule at least one carbon-carbon unsaturated bond (except carbon-carbon unsaturated bond of aromatic ring) and at least one epoxy group, but, for example, alkenyl glycidyl ethers such as allyl glycidyl ether and butenyl glycidyl ether; alkenyl epoxides such as 3,4-epoxy-1-butene, 1,2-epoxy-5-hexene, and 1,2-epoxy-9-decene; etc. may be mentioned. Among these as well, alkenyl glycidyl ethers are preferable, while an allyl glycidyl ether is more preferable. The unsaturated oxide monomer may be used alone as one type or in combination of two or more types. The ratio of content of the unsaturated oxide monomer unit in the polyether rubber of the present invention is preferably 15 to 0 mol % in the total monomer units, more preferably 12 to 1 mol %, particularly preferably 10 to 2 mol %. If the ratio of content of the unsaturated oxide monomer unit in the polyether rubber is in the range, a polyether rubber which is excellent in cross-linkability is obtained. On the other hand, if the ratio of content of the unsaturated oxide monomer unit is too small, the obtained cross-linked rubber sometimes deteriorates in compression set. Further, if the ratio of content of the unsaturated oxide monomer units is too large, during the polymerization reaction, a gelling reaction (3 dimensionality cross-linking reaction) etc. easily occur in the polymer molecules or among polymer molecules and the shapeability is liable to drop.

The ethylene oxide monomer unit are unit which is formed by an ethylene oxide monomer. The ratio of content of the ethylene oxide monomer unit in the polyether rubber of the present invention is preferably 90 to 0 mol % in the total monomer units, more preferably 80 to 20 mol %, particularly preferably 75 to 40 mol %. If the ratio of content of the ethylene oxide monomer unit in the polyether rubber is in this range, a polyether rubber which is excellent in low electrical resistance property is obtained. On the other hand, if the ratio of content of the ethylene oxide monomer unit is too small, the effect of reduction of the electrical resistance value of the obtained cross-linked rubber becomes hard to obtain. Further, if the ratio of content of the ethylene oxide monomer unit is too great, production of a polyether rubber is liable to become difficult.

The polyether rubber of the present invention may be a copolymer which contains, in addition to the unit expressed by the above general formula (1), epihalohydrin monomer unit, unsaturated oxide monomer unit, and ethylene oxide monomer unit, in accordance with need, other monomer units that are copolymerizable with the unit expressed by the above general formula (1) and the each monomer. Among the other monomer units as well, alkylene oxide monomer unit excluding ethylene oxide are preferable. The alkylene oxide monomer which forms alkylene oxide monomer unit excluding ethylene oxide is not particularly limited, but, for example, linear or branched alkylene oxide such as propylene oxide, 1,2-epoxybutane, 1,2-epoxy-4-chloropentane, 1,2-epoxyhexane, 1,2-epoxyoctane, 1,2-epoxydecane, 1,2-epoxyoctadecane, 1,2-epoxyeicosan, 1,2-epoxyisobutane, and 2,3-epoxyisobutane; cyclic alkylene oxide such as 1,2-epoxycycloropentane, 1,2-epoxycyclohexane, and 1,2-epoxycyclododecane; glycidyl ether having a linear or branched alkyl such as butyl glycidyl ether, 2-ethylhexyl glycidyl ether, 2-methyloctyl glycidyl ether, neopentyl glycol diglycidyl ether, decyl glycidyl ether, and stearyl glycidyl ether; glycidyl ether having an oxyethylene side chain such as ethylene glycol diglycidyl ether, diethylene glycol diglycidyl ether, and polyethylene glycol diglycidyl ether; etc. may be mentioned. Among these as well, linear alkylene oxide is preferable, while propylene oxide is more preferable. These alkylene oxide monomers may be used alone as single types or may be jointly used as two types or more. In the polyether rubber of the present invention, the ratio of content of the alkylene oxide monomer unit excluding ethylene oxide is preferably 30 mol % or less in the total monomer units, more preferably 20 mol % or less, furthermore preferably 10 mol % or less. If the ratio of content of the alkylene oxide monomer units excluding ethylene oxide in the polyether rubber is too large, the obtained cross-linked rubber is liable to increase in volume resistivity value.

Further, the other copolymerizable monomers other than an alkylene oxide monomer are not particularly limited, but for example, arylepoxides such as styrene oxide, and phenylglycidyl ether; etc. may be mentioned. In the polyether rubber of the present invention, the ratio of content of the other copolymerizable monomers other than an alkylene oxide monomer is preferably 20 mol % or less in the total monomer units, more preferably 10 mol % or less, furthermore preferably 5 mol % or less.

The polyether rubber before reaction with an onium-forming agent (below, also referred to as a "base polyether rubber") can be obtained by ring-opening polymerization of each monomer described above by the solution polymerization method, or solvent slurry polymerization method, etc.

The polymerization catalyst is not specifically limited if it is a catalyst generally used for polyether polymerization. As the polymerization catalyst, for example, a catalyst obtained by reacting organic aluminum with water and acetyl acetone (Japanese Patent Publication No. 35-15797); a catalyst obtained by reacting triisobutyl aluminum with phosphoric acid and triethylamine (Japanese Patent Publication No. 46-27534); a catalyst obtained by reacting triisobutyl aluminum with an organic acid salt of diazabicycloundecene and phosphoric acid (Japanese Patent Publication No. 56-51171); a catalyst consisting of a partial hydrolyzate of aluminum alkoxide and an organo zinc compound (Japanese Patent Publication No. 43-2945); a catalyst consisting of an organo zinc compound and polyvalent alcohol (Japanese Patent Publication No. 45-7751); a catalyst consisting of dialkyl zinc and water (Japanese Patent Publication No. 36-3394); and a catalyst consisting of tributyl tin chloride and tributyl phosphate (Japanese Patent No. 3223978) etc. may be mentioned.

As the solvent for polymerization is not specifically limited if it is inert, for example, aromatic hydrocarbons such as benzene and toluene; saturated linear hydrocarbons such as n-pentane and n-hexane; and, saturated cyclic hydrocarbons such as cyclopentane and cyclohexane etc. may be used. Of these, when ring-opening polymerization is carried out based on solution polymerization, aromatic hydrocarbons are preferably used from the view point of solubility of the base polyether rubber. Toluene is more preferable.

The polymerization reaction temperature is preferably 20 to 150° C., while 50 to 130° C. is more preferable. The polymerization can be carried out according to any mode including a batch type, a semi-batch type, and a continuous type.

The base polyether rubber may be a copolymer type of either block copolymerization and random copolymerization, but a random copolymer is preferable since the crystallinity of the polyethylene oxide is reduced and the rubber elasticity is hard to impair.

The polyether rubber of the present invention can be suitably obtained by adding an onium-forming agent to a solvent in which base polyether rubber obtained by ring-opening polymerization of each monomer described above is dissolved and subjecting at least part of the halogen atoms which constitute an epihalohydrin monomer unit to an onium-forming reaction. Further, the polyether rubber can be also obtained by recovering first the base polyether rubber that is obtained by ring-opening polymerization of each monomer and adding an onium-forming agent and a solvent to the base polyether rubber for an onium-forming reaction. However, the method is not specifically limited.

The method for recovery of the polyether rubber of the present invention from a solvent is not specifically limited. For example, it is carried out by appropriately combining coagulation, filtration, and drying. As a method of coagulating the polyether rubber from a solvent in which the polyether rubber is dissolved, for example, a common method such as steam stripping or precipitation using a poor solvent can be used. Further, As a method of filtering the polyether rubber from slurry containing the polyether rubber, the method of using in accordance with need, for example, a sieve such as a rotary type screen and a vibrating screen; a centrifugal dehydrator; etc. may be mentioned. As the method of drying the polyether rubber, a dehydration method using a compression type dehydrator such as roll, Banbury type dehydrator, and screw extruder type dehydrator; a method of using a dryer such as screw type extruder, kneader type dryer, expander type dryer, heat wave type dryer, and reduced pressure type dryer; etc. may be mentioned. The compression type dehydrator and dryer may be each used either singly or in combination of two or more.

The polyether rubber of the present invention preferably has a weight average molecular weight of 200,000 to 2,000,000, more preferably 400,000 to 1,500,000. If the weight average molecular weight is too high, the Mooney viscosity becomes higher and the shaping is liable to become difficult. On the other hand, if the weight average molecular weight is too low, the obtained cross-linked rubber is liable to deteriorate in compression set.

The polyether rubber of the present invention preferably has a Mooney viscosity (polymer Mooney viscosity $ML_{1+4}$, 100° C.) of 10 to 120. If the Mooney viscosity is too high, the shapeability becomes inferior and shaping to a conductive member application becomes difficult. Furthermore, swell (that is, diameter of an extruded article is larger than the diameter of a die during extrusion molding) is liable to occur and the dimensional stability to fall. On the other hand, if the Mooney viscosity is too low, the obtained cross-linked rubber is liable to drop in mechanical strength.

<Rubber Composition>

The rubber composition of the present invention preferably contains the polyether rubber of the present invention and a cross-linking agent.

The cross-linking agent which is used in the present invention may be suitably selected by the presence of the above-mentioned cross-linkable monomer unit and type of the same etc., but is not particularly limited so long as it is one which can cross-link the polyether rubber of the present invention. As such a cross-linking agent, for example, sulfur such as powdery sulfur, precipitated sulfur, colloidal sulfur, insoluble sulfur, and highly dispersed sulfur; sulfur-containing compounds such as sulfur monochloride, sulfur dichloride, morpholine disulfide, alkyl phenol disulfide, dibenzothiazyl disulfide, N,N'-dithio-bis(hexahydro-2H-azenopine-2), phosphorus-containing polysulfide, and polymer sulfides; organic peroxides such as dicumyl peroxide and di-t-butyl peroxide; quinone dioximes such as p-quinone dioxime, and p,p'-dibenzoylquinone dioxime; organic polyvalent amine compounds such as triethylene tetramine, hexamethylene diamine carbamate, and 4,4'-methylene bis-o-chloroaniline; triazine compounds such as s-triazine-2,4, 6-trithiol; an alkyl phenol resins having a methylol group; etc. may be mentioned. Among these, sulfur, a sulfur-containing compound, or a triazine compound is preferable. When using a cross-linkable monomer comprised of an unsaturated oxide monomer, sulfur or a sulfur-containing compound is more preferable. These cross-linking agents are used alone or in combination of two or more types. The addition ratio of the cross-linking agent is not particularly limited, but is preferably 0.1 to 10 parts by weight with respect to 100 parts by weight of the polyether rubber of the present invention, more preferably 0.2 to 7 parts by weight, furthermore preferably 0.3 to 5 parts by weight. If the amount of the cross-linking agent is too small, the cross-linking rate is liable to become slow, productivity of the obtained cross-linked rubber may be lowered. Further, when the cross-linked rubber obtained thereby is used after grinding, the grindability may be impaired. On the other hand, if the amount of the cross-linking agent is too great, the obtained cross-linked rubber may become higher in hardness or the cross-linking agent may bloom.

When sulfur or a sulfur-containing compound is used as a cross-linking agent, it is preferable to use a cross-linking acceleration aid and a cross-linking accelerator in combination. As the cross-linking acceleration aid, although not specifically limited, for example, zinc oxide and stearic acid etc. may be mentioned. As the cross-linking accelerator, for example, although not specifically limited, guanidine-based; aldehyde/amine based; aldehyde/ammonia-based; thiazole-based; sulfenamide based; thiourea-based; thiuram-based; and dithiocarbamic acid salt-based; etc. may be mentioned. The cross-linking acceleration aids and cross-linking accelerators may be each used alone or in combination of two or more types.

The amounts of each use of the cross-linking acceleration aid and cross-linking accelerator are not particularly limited, but are preferably 0.01 to 15 parts by weight, more preferably 0.1 to 10 parts by weight, with respect to 100 parts by weight of the polyether rubber of the present invention. If the amounts of use of the cross-linking acceleration aid and cross-linking accelerator are too great, the cross-linking rate is liable to become too fast and a bloom is liable to form on the surface of the obtained cross-linked rubber. On the other hand, if too small, the cross-linking rate becomes slow and the productivity inferior, the cross-linking does not sufficiently proceed, and the obtained cross-linked rubbers are liable to become inferior in mechanical properties.

Further, the rubber composition of the present invention may contain the polyether rubber of the present invention and a filler.

Furthermore, the rubber composition of the present invention may contain a polyether rubber of the present invention, filler, and cross-linking agent.

The filler is not particularly limited, but, for example, carbon black, silica, carbon nanotubes, graphene, etc. may be mentioned. These fillers may be used alone or in combinations of two or more types. The addition ratio of the filler is not particularly limited, but is preferably 0.01 to 20 parts by weight with respect to 100 parts by weight of the polyether rubber of the present invention, more preferably 0.1 to 20 parts by weight, particularly preferably 1 to 20 parts by weight. If the amount of the filler is in the above range, the effect of reinforcement of the polyether rubber can be easily obtained.

Further, the rubber composition of the present invention may further contain, within the range that the effect of the present invention is not impaired, diene-based rubber such as butadiene rubber, styrene butadiene rubber, chloroprene rubber, isoprene rubber, natural rubber, acrylonitrile butadiene rubber, butyl rubber, or partially hydrogenated product of those rubbers (for example, hydrogenated nitrile rubber); rubber other than the diene-based rubber such as ethylene propylene rubber, acrylic rubber, polyether rubber (excluding the polyether rubber of the present invention), fluoro rubber, or silicone rubber; thermoplastic elastomer such as olefin-based thermoplastic elastomer, styrene-based thermoplastic elastomer, vinyl chloride-based thermoplastic elastomer, polyester-based thermoplastic elastomer, polyamide-based thermoplastic elastomer, or polyurethane-based thermoplastic elastomer; and a resin such as polyvinyl chloride, a cumarone resin, or a phenol resin. The rubber, thermoplastic elastomer, and resin may be used either singly or in combination of two or more. Total amount of them is preferably 100 parts by weight or less, more preferably 50 parts by weight or less, and furthermore preferably 20 parts by weight or less with respect to 100 parts by weight of the polyether rubber of the present invention.

Furthermore, the rubber composition of the present invention may contain, in addition to the above-mentioned additives, other additives which are usually blended into known rubber. Such an additive is not particularly limited, but for example, an acid acceptor; reinforcing agent; antioxidant; UV absorbing agent; light stabilizer; tackifier; surfactant; conductivity imparting material; electrolyte material; colorant (dye and pigment); flame retardant; anti-static agent; etc. may be mentioned.

The rubber composition of the present invention can be prepared by mixing and kneading a cross-linking agent and/or filler and furthermore various additives which are used in accordance with need into the polyether rubber of the present invention by a desired method. For example, the additives other than the cross-linking agent and cross-linking accelerator may be kneaded with the polyether rubber, then the cross-linking agent and cross-linking accelerator may be mixed with the mixture to obtain the rubber composition. At the time of mixing and kneading, for example, a kneader, Bambury mixer, open roll, calendar roll, extruder, or any other kneading/molding machine may be used alone or in combination for kneading and shaping. The kneading temperature of the additives other than the cross-linking agent and cross-linking accelerator and the polyether rubber is preferably 20 to 200° C., more preferably 20 to 150° C., while the kneading time is preferably 30 seconds to 30 minutes. The mixing temperature of the kneaded mixture and the cross-linking agent and cross-linking accelerator is preferably 100° C. or less. 0 to 80° C. is more preferable.

<Cross-Linked Rubber>

The cross-linked rubber of the present invention is obtained by cross-linking the rubber composition of the present invention which contains a cross-linking agent.

The method for cross-linking the rubber composition of the present invention is not specifically limited. The cross-linking may be carried out either simultaneously with molding or after molding. The temperature for molding is preferably 20 to 200° C., and more preferably 40 to 180° C. The heating temperature for cross-linking is preferably 130 to 200° C., and more preferably 140 to 200° C. When the heating temperature for cross-linking is excessively low, a long time may be required for cross-linking or the cross-linking density of the cross-linked rubber obtained is liable to be lowered. On the other hand, when the heating temperature for cross-linking is excessively high, molding defects may be yielded. The cross-linking time varies depending on cross-linking method, cross-linking temperature, shape, or the like. However, when it is within the range of 1 minute or more and 5 hours or less, it is preferable from the view point of cross-linking density and production efficiency. As a method of heating, any method selected from press heating, oven heating, steam heating, heat wave heating, and microwave heating etc. may be suitably used.

Further, depending on shape and size of the cross-linked rubber, cross-linking may not be fully progressed inside the product even when the cross-linking is found on the surface of the product. In such case, secondary cross-linking may be carried out by further heating. For carrying out secondary cross-linking, the heating temperature is preferably from 100 to 220° C., and more preferably 130 to 210° C. The heating time is preferably 30 minutes to 5 hours.

The volume resistivity value of the cross-linked rubber of the present invention is usually $1 \times 10^{5.0}$ to $1 \times 10^{9.5}$ Ω·cm, preferably $1 \times 10^{5.2}$ to $1 \times 10^{8.0}$ Ω·cm, more preferably $1 \times 10^{5.5}$ to $1 \times 10^{7.5}$ Ω·cm, in terms of the value after 30 seconds from the start of application of voltage in the case of making the applied voltage 1000V in a measurement environment of a temperature of 23° C. and humidity of 50%. If the volume resistivity value of the cross-linked rubber is within the range, a conductive member which is excellent in low electrical resistance property is obtained. On the other hand, if the volume resistivity value of the cross-linked rubber is too high, higher voltage should be applied to obtain the same amount of electric current, causing increased power consumption, and therefore it is undesirable for a conductive member. Further, if the volume resistivity value of the cross-linked rubber is too low, electric current may flow in an undesired direction other than the direction applied with voltage, and thus the function as a conductive member may be impaired.

An increase value in volume resistivity value of the cross-linked rubber of the present invention that is caused by electric current is preferably within the range of 0 to 0.5 in terms of the value obtained by subtracting the log (volume resistivity value) obtained 30 seconds after applying voltage from the log (volume resistivity value) obtained 10 minutes after applying voltage under the condition for measuring volume resistivity value as described above.

The thus obtained cross-linked rubber of the present invention is obtained using the above-mentioned polyether rubber of the present invention, so it has little variation in electrical resistance value and has a low electrical resistance value, and even if used continuously, an increase in the electrical resistance value is suppressed.

<Conductive Member>

The conductive member of the present invention has a cross-linked rubber of the present invention.

The cross-linked rubber of the present invention, by making use of these properties, is useful as a material for various types of industrial rubber products. For example, it can be used for a conductive member such as a conductive roll, a conductive blade, or a conductive belt that are used for a copying machine or a printer; a material for a shoe sole or a hose; a material for a belt such as a conveyor belt or a hand-rail of an escalator; a seal, and a packing material; etc. In particular, the cross-linked rubber of the present invention has little variation in electrical resistance value, has low electrical resistance value, and even if used continuously, an increase in the electrical resistance value is suppressed, so can be suitably used for a conductive member which is used for a copier, printer, etc., in particular a conductive roll.

EXAMPLES

Below, examples and comparative examples will be given to explain the present invention more specifically. Note that, in the examples, the parts and % are based on weight unless otherwise indicated.

Various physical properties were evaluated according to the methods described below.

[Content of Onium Ion Units]

In the examples, the onium ion unit content is measured as follows using a nuclear magnetic resonance apparatus ($^1$H-NMR). Cationized polyether rubber 30 mg, which had been obtained by the onium-forming followed by coagulation and drying, was added to 1.0 mL of deuterated chloroform and shaken for 1 hour for homogenous dissolution. The obtained solution was then measured by $^1$H-NMR to calculate the content ratio of onium ion unit. First, from the integrated values of the proton derived from the polyether chain, which is, a main chain of the cationized polyether rubber, mole number B1 of the entire monomer units in the polymer (including onium ion unit) was calculated. Next, from the integrated values of the proton derived from an onium ion-containing group, mole number B2 of the introduced onium ion units (i.e., the unit represented by the above general formula (1)) was calculated. Thereafter, by dividing the mole number B2 of the introduced onium ion units (i.e., the unit represented by the above general formula (1)) by the mole number B1 of the entire monomer units in the polymer (including onium ion unit), content ratio of onium ion unit was calculated as represented by the following formula (4).

Content ratio of onium ion unit (mol %)=100×$B2/B1$ (4)

[Mooney Viscosity]

The Mooney viscosity was measured in accordance with JIS K6300 at 100° C.

[Volume Resistivity Value (23° C., 50% RH)]

The rubber composition was shaped and cross-linked at a temperature of 160° C. and 30 minutes by a press to obtain a vertical 15 cm, horizontal 10 cm, thickness 2 mm sheet-shaped cross-linked rubber (sheet-shaped test piece). Further, the obtained sheet-shaped cross-linked rubber was used to measure the volume resistivity value. Note that, the volume resistivity value was measured based on the double ring electrode method of JIS K6271, the measurement conditions were made a temperature of 23° C. and a humidity of 50%, the applied voltage was made 1000V, and the value 30 seconds after the start of application of the voltage was measured.

[Increase Value in Volume Resistivity Value Caused by Electric Current (23° C., 50% RH)]

An increase value in volume resistivity value that was caused by electric current was obtained by subtracting the log (volume resistivity value) obtained 30 seconds after applying voltage from the log (volume resistivity value) obtained 10 minutes after applying voltage under the condition for measuring volume resistivity value as described above. Further, improvement ratio of the increase caused by electric current is defined by the following general formula (6).

$$\begin{aligned}&\text{Improvement ratio of increase caused by electric}\\&\text{current (\%)}=100\times[(\text{Increase value of volume}\\&\text{resistivity value of base polyether rubber caused}\\&\text{by electric current})-(\text{Increase value of volume}\\&\text{resistivity value of cationized polyether rubber}\\&\text{caused by electric current})]/(\text{Increase value of}\\&\text{volume resistivity value of base polyether rubber caused by electric current})\end{aligned} \quad (6)$$

Note that, the base polyether rubber of the cationized polyether rubber of Examples 1 to 4 is the Polyether Rubber A which is used in Comparative Example 1, the base polyether rubber of the cationized polyether rubber of Example 5 is the Polyether Rubber B which is used in Comparative Example 2, and the base polyether rubber of the cationized polyether rubber of Example 6 is the Polyether Rubber C which is used in Comparative Example 3.

[Measurement of Compression Set]

The rubber composition was shaped and cross-linked by a press at a temperature of 160° C. for 30 minutes to obtain a diameter 29 mm, height 12.7 mm columnar shaped cross-linked rubber (columnar shaped test piece). Further, in accordance with JIS K6262, the obtained cross-linked rubber was compressed 25%, allowed to stand in that state in a 70° C. environment for 22 hours, then the compression was released and the compression set was measured. The smaller the compression set in value, the more the rubber elasticity is held and the better the rubber can be judged.

Production Example 1

Production of Polymerization Catalyst

The inside of a hermetically sealed pressure resistant glass container was substituted by nitrogen and supplied with toluene 200 parts and triisobutyl aluminum 60 parts. This glass bottle was immersed in ice water to cool it, then diethyl ether 230 parts was added and stirred in. Next, while cooling by ice water, phosphoric acid 13.6 parts was added and further stirred in. At this time, the reaction between the triisobutyl aluminum and phosphoric acid causes the pressure inside the container to rise, so the pressure was suitably relieved. The obtained reaction mixture was matured in a 60° C. warm water bath for 1 hour to obtain a catalyst solution.

Production Example 2

Production of Polyether Rubber A

To an autoclave, epichlorohydrin 223.5 parts, allyl glycidyl ether 27.5 parts, ethylene oxide 19.7 parts, and toluene 2585 parts were added. While stirring in a nitrogen atmosphere, the internal solution was raised in temperature to 50° C. and the above obtained catalyst solution 11.6 parts was added to start the reaction. Next, from the start of the reaction, a solution comprised of ethylene oxide 129.3 parts dissolved in toluene 302 parts was continuously added over 5 hours at an equal speed. Further, every 30 minutes after the start of the reaction, the catalyst solution was added in amounts of 6.2 parts each for addition over 5 hours. Next, water 15 parts was added and stirred in and the reaction was ended. To this, furthermore, an antioxidant comprised of 4,4'-thiobis-(6-tert-butyl-3-methylphenol) in 5% toluene solution 45 parts was added and stirred in. Steam stripping was performed to remove the toluene and remove the supernatant water, then the result was dried in vacuo at 60° C. to obtain the Polyether Rubber A 400 parts. This polyether rubber A had a ratio of composition of monomers of epichlorohydrin monomer unit 40 mol %, ethylene oxide monomer unit 56 mol %, and allyl glycidyl ether monomer unit 4 mol %. Further, the Mooney viscosity was 60.

Production Example 3

Production of Polyether Rubber B

To an autoclave, epichlorohydrin 198.6 parts, allyl glycidyl ether 28.9 parts, ethylene oxide 22.8 parts, and toluene 2585 parts were added. While stirring in a nitrogen atmosphere, the internal solution was raised in temperature to 50° C. and the above obtained catalyst solution 11.6 parts was added to start the reaction. Next, from the start of the reaction, a solution comprised of ethylene oxide 149.7 parts dissolved in toluene 302 parts was continuously added over 5 hours at an equal speed. Further, every 30 minutes after the start of the reaction, the catalyst solution was added in amounts of 6.2 parts each for addition over 5 hours. Next, water 15 parts was added and stirred in and the reaction was ended. To this, furthermore, an antioxidant comprised of 4,4'-thiobis-(6-tert-butyl-3-methylphenol) in 5% toluene solution 45 parts was added and stirred in. Steam stripping was performed to remove the toluene and remove the supernatant water, then the result was dried in vacuo at 60° C. to obtain the Polyether Rubber B 400 parts. This polyether rubber B had a ratio of composition of monomers of epichlorohydrin monomer unit 34 mol %, ethylene oxide monomer unit 62 mol %, and acryl glycidyl ether monomer unit 4 mol %. Further, the Mooney viscosity was 45.

Production Example 4

Production of Polyether Rubber C

To an autoclave, epichlorohydrin 304 parts, allyl glycidyl ether 15 parts, ethylene oxide 11.2 parts, and toluene 2585 parts were added. While stirring in a nitrogen atmosphere, the internal solution was raised in temperature to 50° C. and the above obtained catalyst solution 11.6 parts was added to start the reaction. Next, from the start of the reaction, a solution comprised of ethylene oxide 69.8 parts dissolved in toluene 302 parts was continuously added over 5 hours at an equal speed. Further, every 30 minutes after the start of the reaction, the catalyst solution was added in amounts of 6.2 parts each for addition over 5 hours. Next, water 15 parts was added and stirred in to cause the reaction to end. To this, furthermore, an antioxidant comprised of 4,4'-thiobis-(6-tert-butyl-3-methylphenol) in 5% toluene solution 45 parts was added and stirred in. Steam stripping was performed, the supernatant water was removed, then the result was dried in vacuo at 60° C. to obtain the polyether rubber C 400 parts. This polyether rubber C had a ratio of composition of monomers of epichlorohydrin monomer unit 62.5 mol %, ethylene oxide monomer unit 35 mol %, and allyl glycidyl ether monomer unit 2.5 mol %. Further, the Mooney viscosity was 90.

Example 1

Production of Cationized Polyether Rubber 1

To a glass reactor equipped with a stirrer, the Polyether Rubber A 181 parts and toluene 1211 parts were added and stirred in at 50° C. for 12 hours to make the Polyether Rubber A dissolve. Next, methanol 70 parts was added and stirred in for 15 minutes. To thus obtained polyether rubber solution, 1-methylimidazole 93 parts was added. While stirring, the mixture was raised in temperature to 75° C. The reaction was performed at 75° C. for 96 hours. After 96 hours, the reaction solution was cooled down to 20° C. to stop the reaction. The reaction solution was coagulated by distilling off the solvent by steam, then was filtered to remove the water, then dried in vacuo to recover the Cationized Polyether Rubber 1 in a yield of 192 parts. The obtained Cationized Polyether Rubber 1 was measured by $^1$H-NMR in accordance with the above-mentioned method so as to calculate the onium ion unit content. The obtained Cationized Polyether Rubber 1 had an onium ion unit content of 3.39 mol % and a Mooney viscosity of 70.

(Production of Rubber Composition 1 and Cross-Linked Rubber 1)

To a Bambury mixer, 100 parts of the above obtained Cationized Polyether Rubber 1, a filler comprised of carbon black (Seast SO, made by Tokai Carbon) 10 parts, a cross-linking acceleration aid comprised of Zinc White No. 1 (ZnO#1, made by Seido Chemical) 5 parts, and a cross-linking acceleration aid comprised of stearic acid 0.5 part were charged. The mixture was kneaded at 50° C. for 5 minutes, then the rubber composition was discharged from a Bambury mixer. Next, to a open roll at 50° C., this rubber composition, a cross-linking agent comprised of sulfur (Sulfax PMC, made by Tsurumi Chemical) 0.5 part, a cross-linking agent comprised of morpholine disulfide (Vulnoc R, made by Ouchi Shinko Chemical Industrial Co., Ltd.) 1 part, a cross-linking accelerator comprised of tetraethyl thiuram disulfide (Noccelar TET, made by Ouchi Shinko Chemical Industrial Co., Ltd.) 1 part and dibenzothiazyl disulfide (Noccelar DM, made by Ouchi Shinko Chemical Industrial Co., Ltd.) 1.5 parts were charged. The mixture was kneaded for 10 minutes to prepare the Rubber Composition 1. This Rubber Composition 1 was cross-linked by pressing at 160° C. for 30 minutes to prepare the Cross-linked rubber 1 (Test Piece 1). The Test Piece 1 was evaluated for volume resistivity value (23° C., 50% RH) and other physical properties. Table 1 shows the results.

TABLE 1

| | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Base polyether rubber | Polyether Rubber A EO/ECH/AGE = 56/40/4 | | | | Polyether Rubber B EO/ECH/AGE = 62/34/4 | Polyether Rubber C EO/ECH/AGE = 35/62.5/2.5 | Polyether Rubber A EO/ECH/AGE = 56/40/4 | Polyether Rubber B EO/ECH/AGE = 62/34/4 | Polyether Rubber C EO/ECH/AGE = 35/62.5/2.5 |
| Onium-forming agent | 1-Me-Im | | | | | | — | — | — |
| Onium ion unit content (mol %) | 3.39 | 0.81 | 2.18 | 9.67 | 1.79 | 2.28 | | 0.00 | |
| Cationized polyether rubber composition ratio (EO/ECH/N+/AGE) | 56/36.61/3.39/4 | 56/39.19/0.81/4 | 56/37.82/2.18/4 | 62/30.33/9.67/4 | 62/32.21/1.79/4 | 35/60.22/2.28/2.5 | — | — | — |
| Mooney viscosity | 70 | 63 | 67 | 89 | 50 | 97 | 60 | 45 | 90 |
| log(volume resistivity value) | 6.47 | 7.24 | 7.13 | 5.86 | 6.53 | 7.75 | 7.71 | 7.70 | 8.25 |
| Increase value in volume resistivity value caused by electric current | 0.07 | 0.38 | 0.23 | 0.00 | 0.27 | 0.09 | 0.51 | 0.65 | 0.36 |
| Improvement ratio of increase caused by electric current [%] | 86 | 25 | 55 | 100 | 58 | 75 | — | — | — |
| Compression set [%] (70° C. 22 hours) | 1 | 9 | 2 | 4 | 3 | 3 | 23 | 23 | 25 |

* In the table, EO: ethylene oxide monomer unit, ECH: epichlorohydrin monomer unit, AGE: allyl glycidyl ether monomer unit 1-Me-Im: 1-methylimidazole, N+: onium ion unit (unit shown by general formula (1))

Example 2

Production of Cationized Polyether Rubber 2

To a glass reactor equipped with a stirrer, the Polyether Rubber A 181 parts and toluene 1211 parts were added and the mixture stirred at 50° C. for 12 hours to make the Polyether Rubber A dissolve. Next, methanol 70 parts was added and the mixture stirred for 15 minutes. To thus obtained polyether rubber solution, 1-methylimidazole 43.8 parts was added. While stirring, the mixture was raised in temperature to 85° C. The reaction was performed at 85° C. for 96 hours. After 96 hours, the reaction solution was cooled down to 20° C. to stop the reaction. The reaction solution was made to coagulate by distilling off the solvent by steam, then was filtered to remove the water, then was dried in vacuo so as to recover the Cationized polyether rubber 2 in a yield of 180 parts. The obtained Cationized polyether rubber 2 was measured by $^1$H-NMR to calculate the onium ion unit content. The obtained Cationized polyether rubber 2 had an onium ion unit content of 0.81 mol % and a Mooney viscosity of 63.

(Production of Rubber Composition 2 and Cross-Linked Rubber 2)

Except for, instead of using 100 parts of Cationized polyether rubber 1, using 100 parts of Cationized polyether rubber 2, the same procedure was followed as in Example 1 to prepare and produce the Rubber Composition 2 and Cross-linked rubber 2 (Test Piece 2). This Test Piece 2 was evaluated for physical properties such as the volume resistivity value (23° C., 50% RH). Table 1 shows the results.

Example 3

Production of Cationized Polyether Rubber 3

To a glass reactor equipped with a stirrer, the Polyether Rubber A 181 parts and toluene 1211 parts were added and the mixture stirred at 50° C. for 12 hours to make the Polyether Rubber A dissolve. Next, methanol 70 parts were added and the mixture stirred for 15 minutes. To thus obtained polyether rubber solution, 1-methylimidazole 43.8 parts was added. While stirring, the mixture was raised in temperature to 95° C. The reaction was performed at 95° C. for 72 hours. After 72 hours, the reaction solution was cooled down to 20° C. to stop the reaction. The reaction solution was coagulated by distilling off the solvent by steam, then was filtered to remove the water, then dried in vacuo to recover the Cationized polyether rubber 3 in a yield of 185 parts. The obtained Cationized polyether rubber 3 was measured by $^1$H-NMR in accordance with the above-mentioned method so as to calculate the onium ion unit content. The obtained Cationized polyether rubber 3 had an onium ion unit content of 2.18 mol % and a Mooney viscosity of 67.

(Production of Rubber Composition 3 and Cross-Linked Rubber 3)

Except for, instead of using 100 parts of Cationized polyether rubber 1, using 100 parts of Cationized polyether rubber 3, the same procedure was followed as in Example 1 to prepare and produce the Rubber Composition 3 and Cross-linked rubber 3 (Test Piece 3). This Test Piece 3 was evaluated for physical properties such as the volume resistivity value (23° C., 50% RH). Table 1 shows the results.

Example 4

Production of Cationized Polyether Rubber 4

To a glass reactor equipped with a stirrer, the Polyether Rubber A 181 parts and toluene 1211 parts were added and the mixture stirred at 50° C. for 12 hours to make the Polyether Rubber A dissolve. Next, methanol 70 parts was added and the mixture stirred for 15 minutes. To thus obtained polyether rubber solution, 1-methylimidazole 87.6 parts was added. While stirring, the mixture was raised in temperature to 105° C. The reaction was performed at 105° C. for 72 hours. After 72 hours, the reaction solution was cooled down to 20° C. to stop the reaction. The reaction solution was coagulated by distilling off the solvent by steam, then was filtered to remove the water, then dried in vacuo to recover the Cationized polyether rubber 4 in a yield of 201 parts. The obtained Cationized polyether rubber 4 was measured for $^1$H-NMR in accordance with the above-mentioned method so as to calculate the onium ion unit content. The obtained Cationized polyether rubber 4 had an onium ion unit content of 9.67 mol % and a Mooney viscosity of 89.

(Production of Rubber Composition 4 and Cross-Linked Rubber 4)

Except for, instead of using 100 parts of Cationized polyether rubber 1, using 100 parts of Cationized polyether rubber 4, the same procedure was followed as in Example 1 to prepare and produce the Rubber Composition 4 and Cross-linked rubber 4 (Test Piece 4). This Test Piece 4 was evaluated for physical properties such as the volume resistivity value (23° C., 50% RH). Table 1 shows the results.

Example 5

Production of Cationized Polyether Rubber 5

To a glass reactor equipped with a stirrer, the Polyether Rubber B 181 parts and toluene 1211 parts were added and the mixture stirred at 50° C. for 12 hours to make the Polyether Rubber B dissolve. Next, methanol 70 parts was added and the mixture stirred for 15 minutes. To thus obtained polyether rubber solution, 1-methylimidazole 43.8 parts was added. While stirring, the mixture was raised in temperature to 95° C. The reaction was performed at 95° C. for 72 hours. After 72 hours, the reaction solution was cooled down to 20° C. to stop the reaction. The reaction solution was coagulated by distilling off the solvent by steam, then was filtered to remove the water, then dried in vacuo to recover the Cationized polyether rubber 5 in a yield of 183 parts. The obtained Cationized polyether rubber 5 was measured for $^1$H-NMR in accordance with the above-mentioned method so as to calculate the onium ion unit content. The obtained Cationized polyether rubber 5 had an onium ion unit content of 1.79 mol % and a Mooney viscosity of 50.

(Production of Rubber Composition 5 and Cross-Linked Rubber 5)

Except for, instead of using 100 parts of Cationized polyether rubber 1, using 100 parts of Cationized polyether rubber 5, the same procedure was followed as in Example 1 to prepare and produce the Rubber Composition 5 and Cross-linked rubber 5 (Test Piece 5). This Test Piece 5 was evaluated for physical properties such as the volume resistivity value (23° C., 50% RH). Table 1 shows the results.

Example 6

Production of Cationized Polyether Rubber 6

To a glass reactor equipped with a stirrer, the Polyether Rubber C 181 parts and toluene 1211 parts were added and the mixture stirred at 50° C. for 12 hours to make the Polyether Rubber C dissolve. Next, methanol 70 parts was added and the mixture stirred for 15 minutes. To thus obtained polyether rubber solution, 1-methylimidazole 43.8 parts was added. While stirring, the mixture was raised in temperature to 95° C. The reaction was performed at 95° C. for 72 hours. After 72 hours, the reaction solution was cooled down to 20° C. to stop the reaction. The reaction solution was coagulated by distilling off the solvent by steam, then was filtered to remove the water, then dried in vacuo to recover the Cationized polyether rubber 6 in a yield of 184 parts. The obtained Cationized polyether rubber 6 was measured for $^1$H-NMR in accordance with the above-mentioned method so as to calculate the onium ion unit content. The obtained Cationized polyether rubber 6 had an onium ion unit content of 2.28 mol % and a Mooney viscosity of 97.

(Production of Rubber Composition 6 and Cross-Linked Rubber 6)

Except for, instead of using 100 parts of Cationized polyether rubber 1, using 100 parts of Cationized polyether rubber 6, the same procedure was followed as in Example 1 to prepare and produce the Rubber Composition 6 and Cross-linked rubber 6 (Test Piece 6). This Test Piece 6 was evaluated for physical properties such as the volume resistivity value (23° C., 50% RH). Table 1 shows the results.

Comparative Example 1

Production of Rubber Composition 7 and Cross-Linked Rubber 7

Except for, instead of using 100 parts of Cationized polyether rubber 1, using 100 parts of Polyether Rubber A, the same procedure was followed as in Example 1 to prepare and produce the Rubber Composition 7 and Cross-linked rubber 7 (Test Piece 7). This Test Piece 7 was evaluated for physical properties such as the volume resistivity value (23° C., 50% RH). Table 1 shows the results.

Comparative Example 2

Production of Rubber Composition 8 and Cross-Linked Rubber 8

Except for, instead of using 100 parts of Cationized polyether rubber 1, using 100 parts of Polyether Rubber B, the same procedure was followed as in Example 1 to prepare and produce the Rubber Composition 8 and Cross-linked rubber 8 (Test Piece 8). This Test Piece 8 was evaluated for physical properties such as the volume resistivity value (23° C., 50% RH). Table 1 shows the results.

Comparative Example 3

Production of Rubber Composition 9 and Cross-Linked Rubber 9

Except for, instead of using 100 parts of Cationized polyether rubber 1, using 100 parts of Polyether Rubber C, the same procedure was followed as in Example 1 to prepare and produce the Rubber Composition 9 and Cross-linked rubber 9 (Test Piece 9). This Test Piece 9 was evaluated for physical properties such as the volume resistivity value (23° C., 50% RH). Table 1 shows the results.

As shown in Table 1, the Cross-linked rubbers 1 to 4 which use the polyether rubbers of the present invention (Example 1 to 4) have volume resistivity values lower than the Cross-linked rubber 7 which uses the base Polyether Rubber A which does not have a group which contains a cationic nitrogen-containing aromatic heterocyclic ring (Comparative Example 1). Further, the increase value in volume resistivity value caused by electric current was also suppressed. Similarly, the Cross-linked rubber 5 which uses the polyether rubber of the present invention (Example 5) has a volume resistivity value lower than the Cross-linked rubber 8 which uses the base polyether rubber B (Comparative Example 2), while similarly the Cross-linked rubber 6 which uses the polyether rubber of the present invention (Example 6) has one lower than the Cross-linked rubber 9 which uses the base polyether rubber C (Comparative Example 3). Further, the increase value in volume resistivity value caused by electric current was also suppressed. Furthermore, the Cross-linked rubbers 1 to 6 which use the polyether rubbers of the present invention (Examples 1 to 6) also have small compression set, so are confirmed to hold their rubber elasticities and to be suitable for applications as conductive members.

The invention claimed is:

1. A polyether rubber comprising units expressed by the following general formula (1) in 0.1 mol % or more but less than 30 mol %,

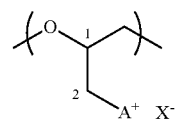

(1)

wherein in the above general formula (1), A$^+$ is a group which contains a cationic nitrogen-containing aromatic heterocyclic ring, said group which contains a cationic nitrogen-containing aromatic heterocyclic ring is bonded with the carbon atom at the "2" position which is shown in the above general formula (1) through a nitrogen atom which forms said cationic nitrogen-containing aromatic heterocyclic ring, and X$^-$ is arbitrary counter anion.

2. The polyether rubber as set forth in claim 1, wherein the structure of a nitrogen-containing aromatic heterocyclic ring in said cationic nitrogen-containing aromatic heterocyclic ring is a five-membered heterocyclic ring or six-membered heterocyclic ring.

3. The polyether rubber as set forth in claim 2, wherein the structure of the nitrogen-containing aromatic heterocyclic ring in said cationic nitrogen-containing aromatic heterocyclic ring is an imidazole ring.

4. The polyether rubber as set forth in claim 1, further comprising cross-linkable monomer units.

5. The polyether rubber as set forth in claim 4, wherein said cross-linkable monomer units are selected from the group consisting of epihalohydrin monomer units, unsaturated oxide monomer units, and combinations thereof.

6. A rubber composition comprising the polyether rubber as set forth in claim 1 and a cross-linking agent.

7. A cross-linked rubber obtained by cross-linking the rubber composition as set forth in claim 6.

8. A conductive member comprising the cross-linked rubber as set forth in claim 7.

9. A rubber composition comprising the polyether rubber as set forth in claim 1 and a filler.

10. A rubber composition as set forth in claim 9, further comprising a cross-linking agent.

11. A cross-linked rubber obtained by cross-linking the rubber composition as set forth in claim 10.

12. A conductive member comprising the cross-linked rubber as set forth in claim 11.

13. The polyether rubber as set forth in claim 1, wherein the polyether rubber comprises units expressed by the general formula (1) in 0.1 mol % or more but less than 25 mol %.

\* \* \* \* \*